A. BRUSSOLO.
MACARONI CUTTER.
APPLICATION FILED JULY 29, 1913.
1,120,270.
Patented Dec. 8, 1914.
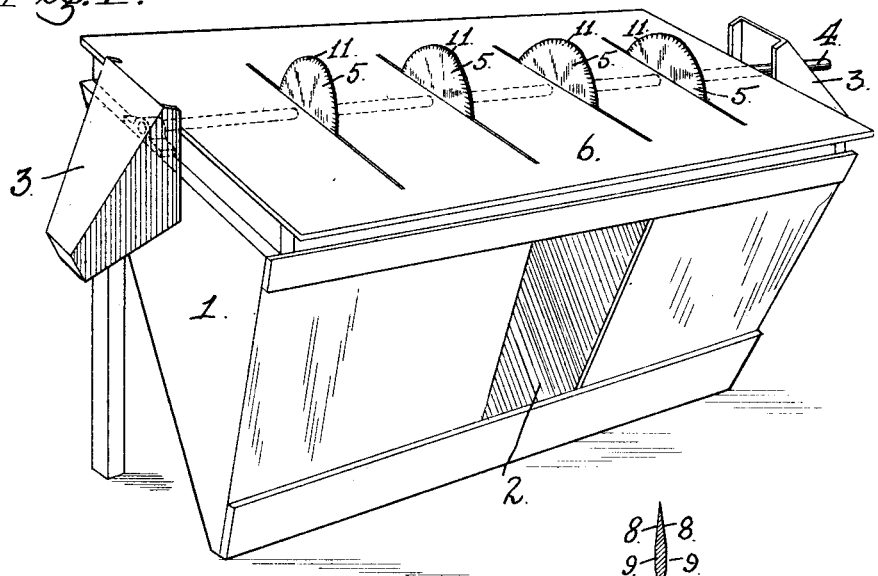
Fig. 1.
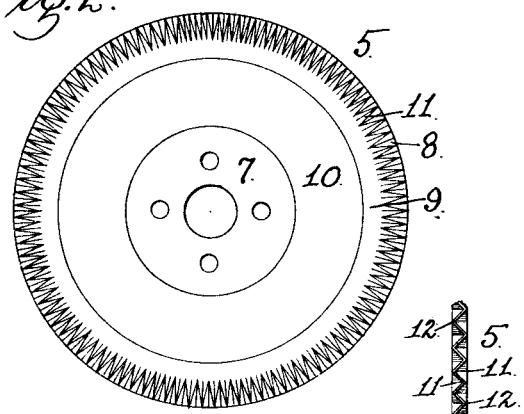
Fig. 2.
Fig. 4.
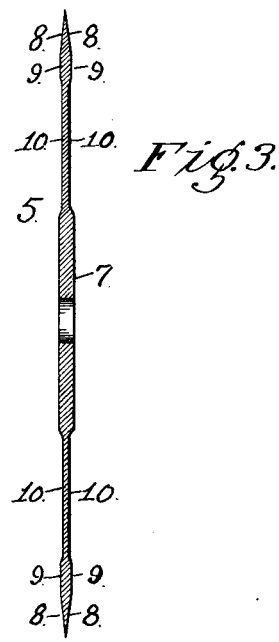
Fig. 3.
WITNESSES:
H. A. Stock
S. Constine
INVENTOR
Angelo Brussolo
BY
Wm F. Booth
ATTORNEY

UNITED STATES PATENT OFFICE.

ANGELO BRUSSOLO, OF SAN FRANCISCO, CALIFORNIA, ASSIGNOR TO LAWRENCE F. FAURE, OF SAN FRANCISCO, CALIFORNIA.

MACARONI-CUTTER.

1,120,270.      Specification of Letters Patent.      Patented Dec. 8, 1914.

Application filed July 29, 1913. Serial No. 781,741.

*To all whom it may concern:*

Be it known that I, ANGELO BRUSSOLO, a subject of the King of Italy, residing in the city and county of San Francisco and State of California, have invented certain new and useful Improvements in Macaroni-Cutters, of which the following is a specification.

My invention relates to the class of machines for cutting Italian paste, such as macaroni, spaghetti, vermicelli, and the like, into sections of given length for packing in cartons. These machines are known in the art by the general title of "macaroni-sawing-machines," the term sawing being evidently employed by reason of the fact that the rotating disks or blades by which the severing is effected have serrated edges, such edges being required in order to cut through the dried and highly brittle sticks by a sawing action in contra-distinction to the mere incision of a plain or relatively smooth cutting edge which is impractical for this work.

In machines of this class there is a plurality or gang of spaced cutting disks or saws mounted upon a rotating shaft and arranged in a frame to which is applied a reciprocative work-table, generally operated by hand, upon which the macaroni or other paste-sticks are placed and carried or fed to the saws which sever them into given lengths. Owing to the brittle character of the dried sticks, it is a difficult matter to sever them with a smooth clean cut, and the result is that many are broken; and even when cut, the severed ends are more or less jagged, with pieces torn out and points left, so that they present, when packed in the cartons, a ragged and unsightly appearance which materially detracts from the merchantability, and reputation of the goods, besides wasting space in the packing.

It is the object of my invention to obviate this disadvantage by providing for a smooth, clean cut, with no tendency to break the sticks, so that the severed pieces when packed in the cartons will present, when the ends of the carton are opened, a smooth and attractive appearance. This result I secure by the novel cutter which I shall hereinafter fully describe by reference to the accompanying drawings, in which—

Figure 1 is a general view of a machine in which my improved cutters are employed. Fig. 2 is a side-face elevation of one of the cutters. Fig. 3 is a diametrical section of one of said cutters, the roughness of the peripheral areas 8 being not indicated. Fig. 4 is a fragmentary edge view of one of the cutters, purposely enlarged for the sake of clearness.

1 is a frame, embodying a bin 2 for the flour dust from the saw kerfs, and carrying end chutes 3 for the waste ends of the sticks to be swept into them.

4 is a shaft to which rotation is imparted by suitable power. Upon this shaft are mounted in symmetrically spaced relation the cutters 5, a gang of four being here shown.

6 is the work-table, slitted over the cutters and adapted to be reciprocated upon the frame 1, to carry the sticks placed upon it to the cutters, and to bring the severed sections back again for removal.

The machine thus described is the general type of those of this class.

Referring now to Figs. 2, 3 and 4, the details of my improved cutter will be understood. The cutter 5 is a circular plate or disk. At its central or hub area 7 it has its maximum thickness for strength. At its annular peripheral area 8 it is beveled on each face uniformly to its edge. Back of this peripheral area its thickness is uniform for a short distance, as shown at 9, and back of this area 9 its thickness is reduced uniformly on each face, as shown at 10, to the circle where it merges into the hub area 7. The beveled annular peripheral area 8 on each face of the disk is roughened, as shown at 11. The object of this roughness is to produce, in action, what may be termed a rasping or filing effect, and, therefore, in the most comprehensive view of my improvement, such roughness may be of any suitable character. In practice I have found that this roughness is best secured by substantially radially directed and closely spaced grooves, the best form of which is that made by a three-cornered file. The grooves extend across the beveled annular peripheral area 8 merging at their inner ends into the thicker area 9, and emerging at their outer ends in the edge of the disk. The grooves on one face of the disk alternate with those on the other face with the result that where they emerge in the edge of the disk, they form said edge into a continuous series of teeth 12 with a set to each side sufficient to give the necessary sawing effect of the cutter. Thus an edge is provided to initiate and complete the cut, while the roughened faces of the annular peripheral area 8, back of the cutting edge, serve to rasp or file the ends of the severed sections of the stick, leaving them clean and smooth. The effect of the annular thinner area 10 is to give a clearance for the severed ends, so that there will be no tendency, by reason of cramping friction to undo or mar the clean work previously done.

I have found in practice that the improved cutter herein described severs the sticks without breaking them and leaves clean, smooth ends.

I claim:—

1. In a machine of the described class, a cutter consisting of a disk having on each face an annular peripheral area beveled uniformly to the edge of the disk, said area being roughened, and said disk having also an inner annular area of less thickness than the maximum thickness of the peripheral area.

2. In a machine of the described class, a cutter consisting of a disk having on each face an annular peripheral area beveled uniformly to the edge of the disk, said area being roughened by substantially radial, closely spaced grooves emerging in the edge of the disk, and said disk having also an inner annular area of less thickness than the maximum thickness of the peripheral area.

3. In a machine of the described class, a cutter consisting of a disk having on each face an annular peripheral area beveled uniformly to the edge of the disk, said area being roughened by substantially radial, closely spaced grooves emerging in the edge of the disk, the grooves on one face alternating with those on the other face, and said disk having also an inner annular area of less thickness than the maximum thickness of the peripheral area.

In testimony whereof I have signed my name to this specification in the presence of two subscribing witnesses.

ANGELO BRUSSOLO.

Witnesses:
 Wm. F. Booth,
 D. B. Richards.

Copies of this patent may be obtained for five cents each, by addressing the "Commissioner of Patents, Washington, D. C."